United States Patent
Nagai et al.

[11] Patent Number: 6,035,248
[45] Date of Patent: Mar. 7, 2000

[54] ROAD FOR GUIDING AN AUTOMATICALLY DRIVEN MOTOR VEHICLE AND A METHOD FOR DRIVING THEREON

[75] Inventors: Takaaki Nagai; Toshiyuki Nosaka, both of Wako, Japan

[73] Assignee: Honda Giken Kogyo Kabushiki Kaisha, Tokyo, Japan

[21] Appl. No.: 08/912,204

[22] Filed: Aug. 15, 1997

[30] Foreign Application Priority Data

Sep. 30, 1996 [JP] Japan .................................. 8-258659

[51] Int. Cl.[7] ................................................. G06F 165/00
[52] U.S. Cl. ............................ 701/23; 180/167; 180/169
[58] Field of Search ................................... 701/23, 24, 25, 701/26; 180/167, 168, 169; 318/587

[56] References Cited

U.S. PATENT DOCUMENTS

| | | | |
|---|---|---|---|
| 4,278,142 | 7/1981 | Kono ........................................ | 180/168 |
| 4,716,530 | 12/1987 | Ogawa et al. ............................ | 180/168 |
| 4,990,841 | 2/1991 | Elder ........................................ | 701/23 |
| 5,000,279 | 3/1991 | Kondo et al. ............................ | 180/168 |
| 5,041,722 | 8/1991 | Suzuki et al. ............................ | 180/168 |
| 5,189,612 | 2/1993 | Lemercier et al. ....................... | 701/23 |
| 5,267,173 | 11/1993 | Tanizawa et al. ........................ | 180/168 |
| 5,329,449 | 7/1994 | Tanizawa et al. ........................ | 180/168 |
| 5,814,961 | 9/1998 | Imahashi .................................. | 180/168 |
| 5,815,825 | 9/1998 | Tachibana et al. ....................... | 180/169 |
| 5,845,725 | 12/1998 | Kawada .................................... | 180/167 |

*Primary Examiner*—Gary Chin
*Attorney, Agent, or Firm*—Birch, Stewart, Kolasch & Birch, LLP

[57] ABSTRACT

A road for guiding an automatically driven vehicle comprises a train of N-polarity magnetic nails arranged along a main path, and a train of S-polarity magnetic nails arranged on a branching path. An automatically driven motor vehicle, including magnetic sensors, runs and is automatically steered by detecting the magnetic nails. The vehicle can be precisely controlled to follow a desired running direction by detecting the presence of magnetic nails with the magnetic sensors. More specifically, at an upstream side of a branch point, when the desired direction is along a main path direction, a driving (steering control) mode of the vehicle is selected in which the magnetic sensors detect N-polarity magnetic nails. Similarly, when the desired direction of travel is along a path which branches off from the main path, a driving (steering control) mode is selected in which the magnetic sensors detect S-polarity magnetic nails. In this manner, the motor vehicle can be automatically driven even at branch points in the road, and wherein the branch points also comprise magnetic nails installed therein at predetermined intervals.

11 Claims, 6 Drawing Sheets

ROAD FOR GUIDING AN AUTOMATICALLY DRIVEN MOTOR VEHICLE AND A METHOD FOR DRIVING THEREON

BACKGROUND OF THE INVENTION

1. Field of the invention

The present invention relates to a road for guiding an automatically driven motor vehicle, wherein the road is provided with a linear array of magnetic information sources arranged therein at predetermined intervals. The present invention also concerns a driving method on such a road, using an automatically driven vehicle having magnetic sensors for detecting the magnetic information sources.

2. Description of the Related Art

It has heretofore been contemplated to provided an automated vehicle control system, for automatically controlling a driven motor vehicle at a predetermined position in a parking lot, as well as an automatic motor vehicle system for driving an automatically driven motor vehicle on a highway.

As one type of automatic motor vehicle running system, there is known the automated highway system which is presently being conducted under the authority of the Ministry of Construction in Japan.

In such a system, an automatically driven motor vehicle runs on a specialized road which is installed with magnetized nails therein. The vehicle is automatically driven by detecting its own vehicle posture based on a direction in which the magnetized nails are installed. Such a system is referred to as an automatic driving road system.

Prior art which relates to the automatic driving road system appears in U.S. patent application Ser. No. 08/739,524. In this document, an automatically driven motor vehicle, including a magnetic sensor, is driven by detecting magnetic information sources disposed in a road and installed therein at substantially regular intervals, for example, at one meter intervals. More specifically, magnetized nails are buried in the center of the road, arranged so as to have the same magnetic polarity according to a desired driving direction.

Using such prior art, therefore, one is basically capable of ascertaining vehicle speed, and the like, by counting the magnetic information sources. Also, by means of magnetic sensors installed in both front and rear positions of the vehicle, one can detect the vehicle posture with respect to the magnetic information sources. In other words, one's posture with respect to the road, i.e. a yaw angle, is determined based on the respective intensities of magnetic fields detected by the two magnetic sensors which detect the magnetic information sources. Further, the road itself provides an NS (north-south) bit train for indicating section information of the road, which is made up of N-polarity magnetic sources and S-polarity magnetic sources, intermixed appropriately at predetermined distances, for example, at every 500 meters, thereby indicating section information of the road. Insofar as it is possible to detect such section information, the vehicle can be corrected for travel distance as well as to position itself on the road accordingly.

However, the road installed with magnetic information sources, as described above, does not have branching sections therein; that is, it is simply a straight non-forking road. However, normally roads, and highways for example, typically include portions therein where one road branches off from the main road. A problem arises, therefore, in how to implement and detect magnetic sources within a branching portion of a road, as well as how to arrange the structure of a portion of a road which includes a branch point therein.

SUMMARY OF THE INVENTION

It is therefore an object of the present invention to provide a road for guiding an automatically driven motor vehicle which is capable of easily recognizing a branching portion of a road installed with magnetic information sources therein.

Another object of the present invention is to provide a driving method for automatically driving a motor vehicle on such a road, wherein the vehicle has magnetic sensors therein for detecting the magnetic information sources.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
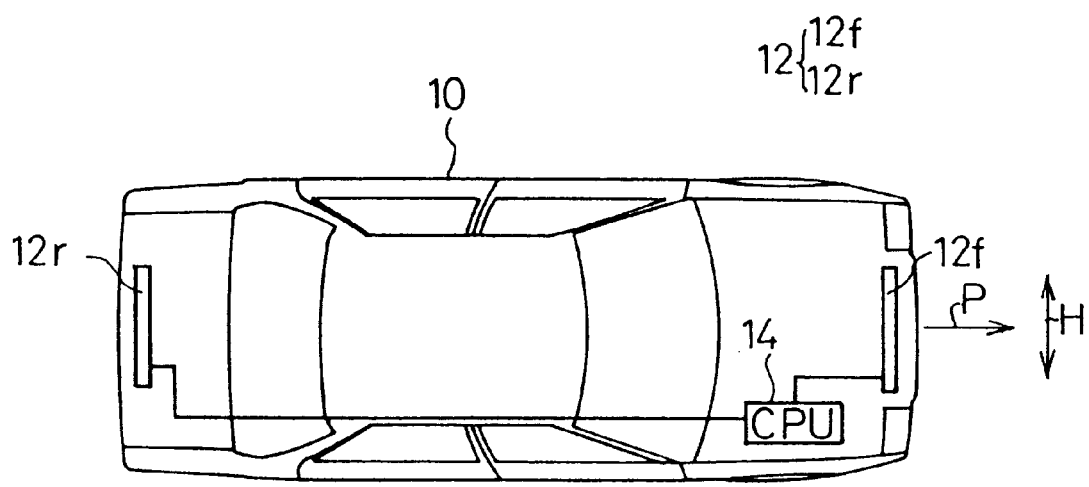
FIG. 1 is a schematic plan view of an automatically driven motor vehicle shown in outline form.

FIG. 1 shows a schematic plan view of an automatically driven motor vehicle 10. Basically, two magnetic sensors 12 (12*f*, 12*r*) are secured respectively near the front and rear bumpers along the axis of the vehicle 10. The each magnetic sensor 12 has plural magnetic sensors disposed along the lateral direction H of the vehicle 10. Output signals from the plural magnetic sensors are converted to digital data using an A/D converter, and then the digital data is provided to a controller 14, the controller including a CPU serving as a decision, control, and calculating means, and further including a ROM, RAM as memory means, etc.

Figure 2:
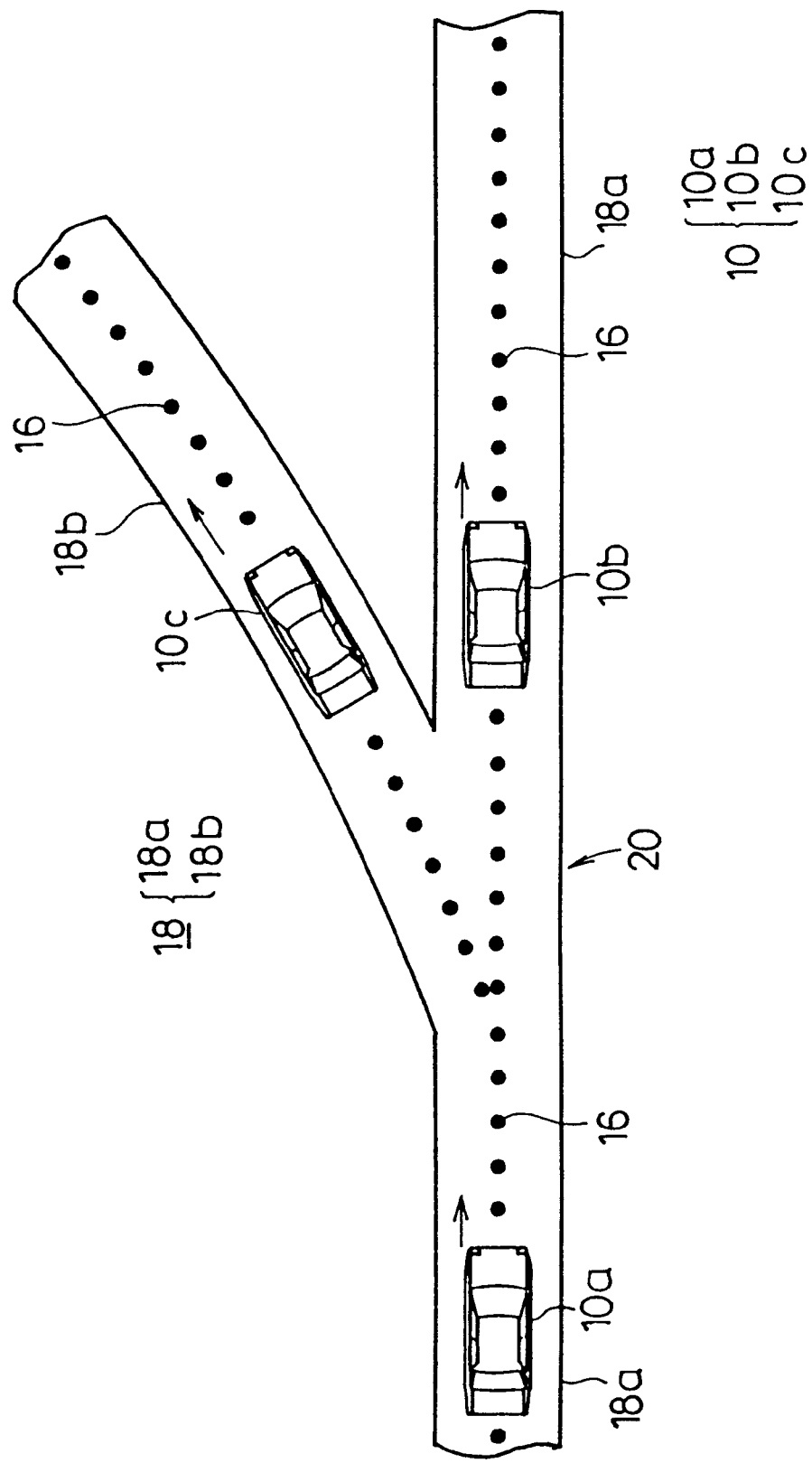
FIG. 2 is a schematic plan view for describing features around a branch point on which the vehicle is to be driven.

FIG. 2 shows a running condition of the automatically driven motor vehicle 10 shown in FIG. 1. The vehicle runs along a road 18 serving as an automatic driving course for guiding the automatically driven motor vehicle, the road having installed therein, along a center line thereof, magnetic information sources which are provided, for example, by magnetic nails 16 disposed at predetermined intervals along the road. In FIG. 2, reference numeral 20 depicts branch point on the road. At the branch point 20, the main path 18*a* of the road separates into a main path 18*a* and a branching path 18*b*. Furthermore, the magnetic information sources are not limited to using magnetic nails 16, but could also comprise electromagnets powered by solar energy sources such as solar cells or the like.

Figure 3:
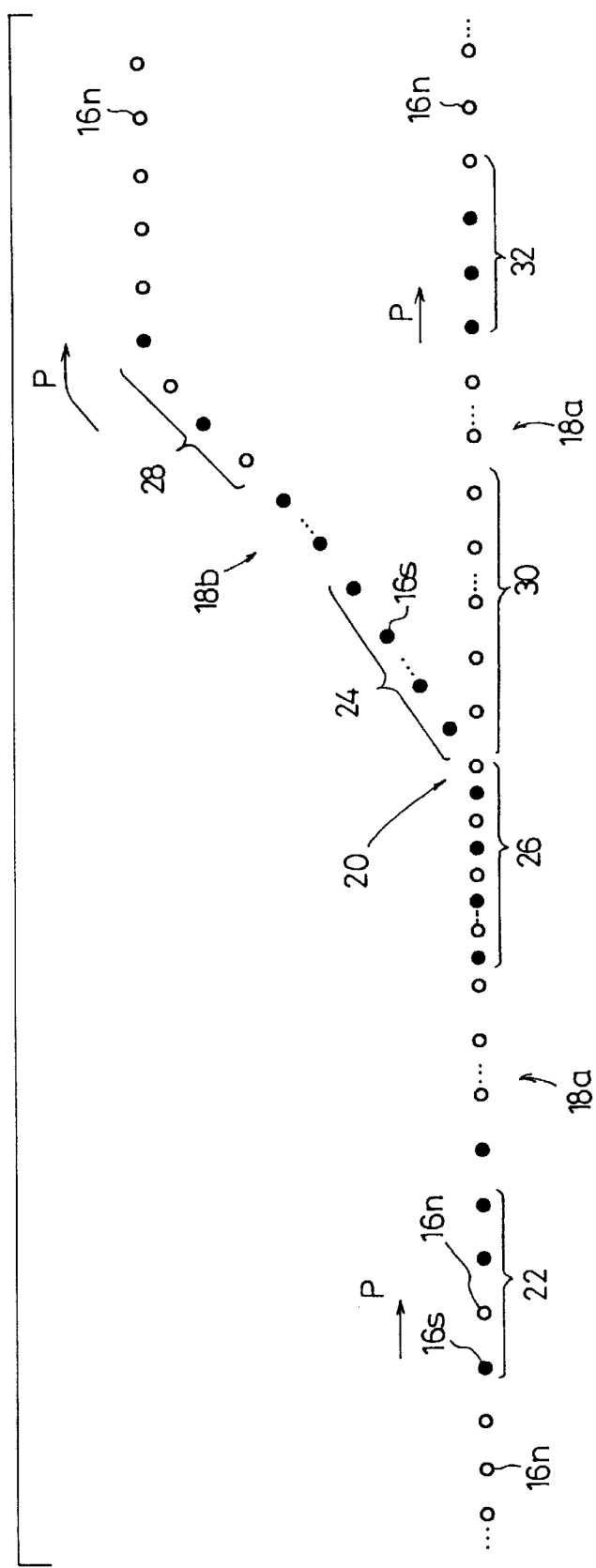
FIG. 3 is a schematic plan view showing the arrangement of magnetized nails around a branch point.

FIG. 3 shows an embodiment in which the magnetic nails 16 are arranged on the road 18, for guiding an automatically driven motor vehicle in the vicinity of the branch point 20. In FIG. 3, N-polarity magnetic nails 16n (i.e. nails wherein the head portion thereof comprises an N-polarity, and the end of the axial portion thereof comprises S-polarity) are shown as white dots. Such nails are basically embedded in the road along the main path 18a and branching path 18b, at predetermined intervals, for example every 2 meters in a continuous manner.

Figure 4:
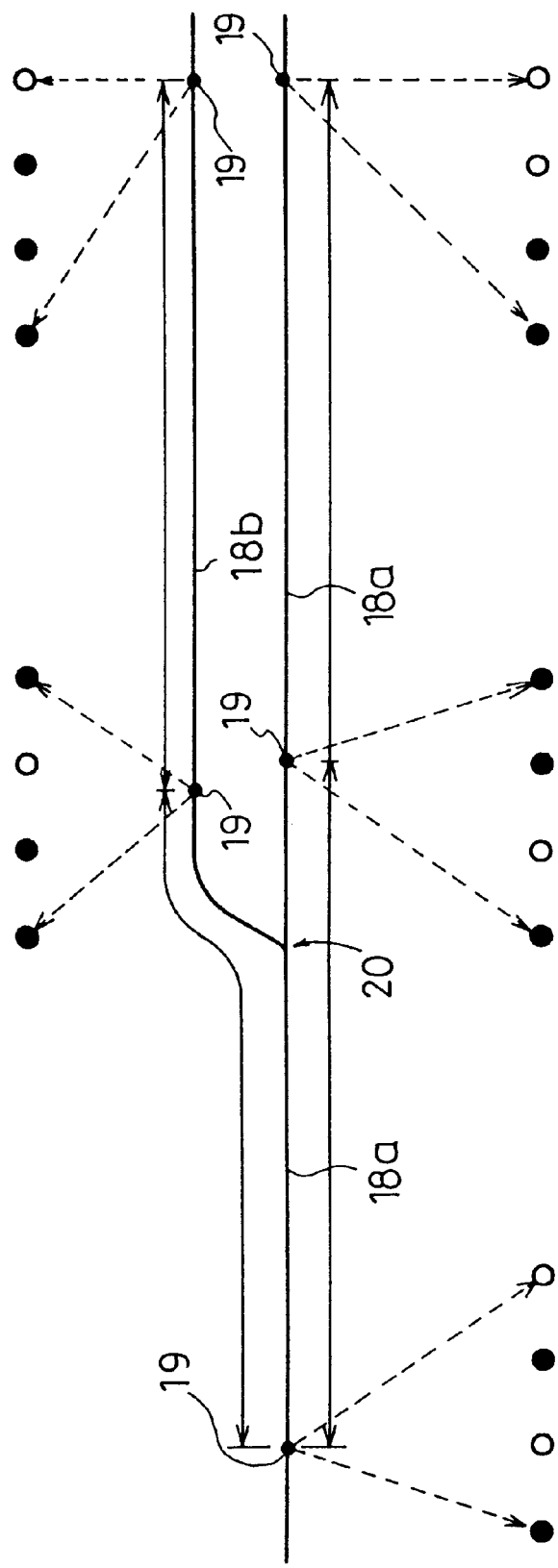
FIG. 4 is a schematic plan view of a road for guiding an automatically driven motor vehicle within a wider area which includes a branch point therein.

As shown in FIG. 4 (which shows an enlarged area including the branch point 20), at predetermined points along the road, information defined by NS bit trains 19, are embedded at predetermined distances, e.g. every 500 meters, along the main and branching paths 18a and 18b, with the exception that no such NS bit trains are disposed in the vicinity of the branch point 20. Such NS bit trains 19 serve to provide information indicative of respective sections of the road, and consist of a combination of several magnetic nails 16 (i.e. N-polarity magnetic nails 16n shown as white dots, and S-polarity magnetic nails 16s which are designated by black dots) thereby inherently indicating each section, or each predetermined length, of the road.

Using the controller 14, which refers to a magnetic nail map stored in the ROM, for example, the exact running position of the vehicle 10 can be recognized automatically on the road map. Furthermore, the magnetic nail map means includes a look-up table in which is written the position, e.g. latitudinal and longitudinal points on a conventional map or a position from a given starting point, as an address of the NS bit train and/or its decoded value. By referring to the magnetic nail map, it can be confirmed whether the vehicle 10 is running according to predicted course or not. Furthermore, the magnetic nail map also has stored therein information which shows the detailed configuration and content of the magnetic nails 16 in the vicinity of the branch point 20.

Referring again to FIG. 3, along the main path 18a of the road, on the side upstream from the branch point 20, an NS bit train portion 22 for notifying the existence of an upcoming branch point is installed. Such a branch point notification NS bit train portion 22 consists of a combination of N and S poles of several bits, for indicating the existence of an upcoming branch point 20 downstream from the bit train portion 22 along the running direction (i.e. from left side to right side of FIG. 3), as designated by the arrow P. Further, a portion 26 comprising an arrangement of alternating N and S poles is installed on the main path 18a just before and in the vicinity of the branch point 20, namely, at an overlapping portion between the main path 18a and the branching path 18b. The NS alternating portion 26, as a result, consists of magnetic nails 16 disposed at 1 meter intervals, due to the fact that the S-polarity magnetic nails 16s (disposed at 2 meter intervals) are inserted between the N-polarity magnetic nails 16n (likewise disposed at 2 meter intervals). Accordingly, one can conceive of this situation as two overlapping paths installed along the same line, consisting of the main path 18a indicated by the N-polarity nails 16n and the branching path 18b indicated by the S-polarity nails 16s. In this embodiment, the interval between the S-polarity nails 16s and the N-polarity nails 16n is 1 meter at the overlapping portion 26, however, the adjacent nails could be disposed at different intervals, so long as the neighboring nails 16 can be distinguished by the magnetic sensor 12 and controller 14.

Furthermore, a starting portion 24 (i.e. a branching portion for providing information that the branch point has just been passed through) of the branching path 18b is installed with a constant number of S-polarity nails 16s, or in other words, such nails 16s are disposed for a constant distance. A downstream side of the starting portion 24 is further installed with an NS bit train portion 28 (NS bit portion for providing information of the end of the branch) which consists of a several bits, indicating that passage through the branch point 20 has ended. Further downstream from the NS bit train portion 28, the path 18b is installed with N-polarity magnetic nails 16n in the same fashion as installed along the main path 18a. In a similar manner, the main path 18a, downstream from the branch point 20, is installed with a constant number of N-polarity nails 16n, or in other words, such nails 16n are disposed for a constant distance along a main path portion 30 immediately following the branch point. Downstream from this portion 30, the main path 18a is installed with an NS bit train portion 32 (NS bit portion for providing information of the end of the branch) which consists of a several bits, indicating that passage through the branch point 20 has ended. Further downstream from the NS bit train portion 32, the path 18a returns to the original configuration of the main path 18a, installed with the typical succession of N-polarity magnetic nails 16n.

Furthermore, in FIG. 3, the presence of ellipsis ( . . . ) therein indicates a continuation. For example, in the NS arrangement 26 for providing information just before a branch point for detecting an upcoming branch point, the presence of ellipsis ( . . . ) indicates a continuation of the illustrated NS alternating arrangement. In other portions of FIG. 3, the presence of ellipsis ( . . . ) indicates a continuation of the arrangement of magnetic nails 16 of the same polarity appearing in front of and behind the ellipsis.

As shown in FIG. 1, magnetic sensors 12f, 12r which are disposed on the vehicle can detect the magnetic field from the respective nails (a characteristic curve of the magnetic field is such that it is large directly above the nail and attenuates outwardly therefrom in the shape of a bell). As stated formerly, for example, the magnetic sensors 12f, 12r comprise a plural number of magnetic sensors of same magnetic sensitivity arranged respectively along the lateral direction H of the vehicle 10. The controller 14 performs data processing of the output signals, detecting the orientation of the vehicle, whereby steering of the vehicle is feedback controlled based on the output signals from the magnetic sensors 12f, 12r.

Figure 5:
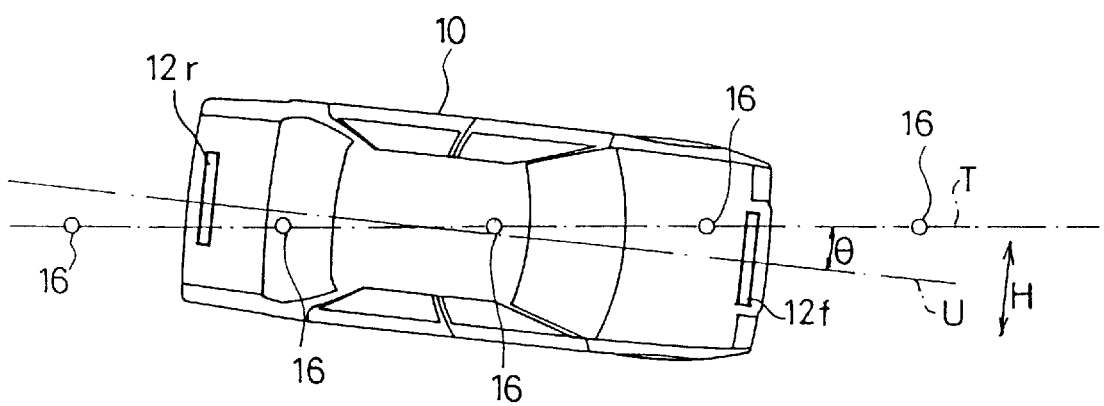
FIG. 5 is a schematic plan view explaining an operation for detecting a posture of the vehicle.

As shown FIG. 5, the posture of the vehicle 10, that is, the orientation of the longitudinal axis of the vehicle 10, is expressed as an angle Θ (a so-called yaw angle) between the longitudinal direction U of the vehicle and the direction T along which the magnetic nails 16 are installed, or in other words, the running path. Accordingly, posture control of the vehicle 10 is essentially a control which operates to keep the yaw angle Θ at zero.

Operation of the aforesaid embodiment will be described below based on the flowchart shown in FIG. 6. In this case, the main control body consists of the controller 14 which is loaded on the vehicle 10.

Figure 6:
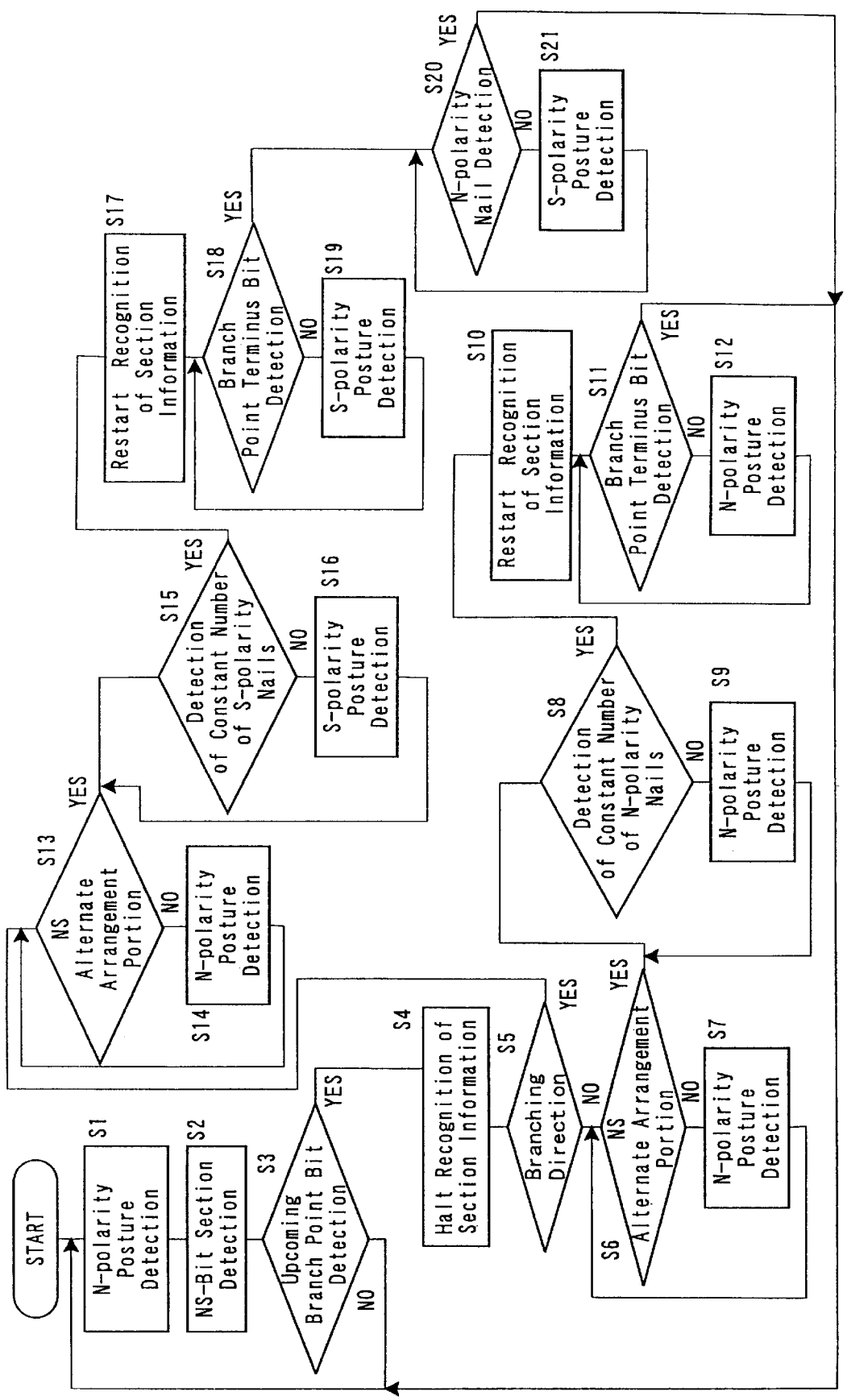
FIG. 6 is a flowchart for explaining an operation for automatically driving a vehicle, including how to drive within branch points.

Following is a summary explanation of the contents of the flowchart shown in FIG. 6. While the vehicle 10 runs towards the vicinity of the branch point 20 from an upstream side of the main path 18, the vehicle 10 senses and refers to the polarity of magnetic nails 16 in the running path, which indicate the direction which is desired to be run, that is, whether the direction is along the main path 18a or along the branching path 18b. Specifically, if the desired direction is along the main path 18a, the controller 14 begins referring to the polarity of the N-polarity nails 16n. Similarly, if the desired direction is along the branching path 18b, the controller begins referring to the polarity of the S-polarity nails 16s. In this manner, when the controller 14 detects magnetic nails having a polarity indicative of the desired direction, the controller 14 detects that the running path corresponds with the desired direction. On the other hand, the controller 14 also detects and/or controls the posture of the vehicle 10, based on data of the lateral orientation of the vehicle 10 as it moves along the running path in the desired direction.

First, referring to FIG. 3, when the vehicle 10 runs from the left side of the figure progressing in the direction shown by the arrow P, the controller 14 on board the vehicle 10 controls steering by detecting the posture of the vehicle 10 with respect to the N-polarity nails 16n (Step S1). The process of Step S1 shall be referred to as the "N-polarity posture detection process" hereinafter.

Secondly, the controller 14 carries out a process for detecting various NS bit train portions 19 which indicate respective sections of the road, which are installed at every 500 meters along the road (Step S2).

Further, the controller 14 on board the vehicle 10 determines whether the NS bit train portion 22, indicative of an upcoming branching portion, has been detected or not, in order to predict the existence of an upcoming branch point 20 downstream from the vehicle 10 (Step S3).

If the decision in Step S3 is NO, the process returns to Step S1 so that the vehicle 10 continues to steer itself by detecting the posture of the vehicle 10 based on the N-polarity nails 16n. If the decision in Step S3 is YES, the controller 14 halts the process for detecting the NS bit train portion 19 for indicating respective road sections, so as to avoid misunderstanding (Step S4) of the detected data. The reason for halting this process is to avoid potential confusion which might occur between the NS bit train 19 for indicating section information (course information) and the NS alternating arrangement portion 26 which occurs just before the branch point 20.

Then, the controller 14 confirms whether the desired traveling direction is to proceed along the branching path 18b, or not, based on a given course information (Step S5) which is pre-loaded and stored into in a RAM, etc., in the controller.

If the desired travelling direction is not along the branching path 18b, in other words, if it is desired that the vehicle 10 continuously run along the main path past the branch point 20, the controller 14 decides whether the NS alternating arrangement portion 26 just before the branch point 20 has been detected or not (Step S6). If the portion 26 is not detected, the controller 14 continues to carry out the N-polarity posture detection process (Step S7).

After the NS alternating arrangement portion 26 has been detected in Step S6, the controller 14 next confirms the existence of a constant number of N-polarity magnetic nails 16n, that is, whether the main path section 30 immediately following passage through the branch point is detected or not (Step S8). If section 30 is not detected, the controller 14 again continues to carry out the N-polarity posture detection process (Step S9).

If the decision in Step S8 is YES, then the controller 14 restarts the process (which was halted in Step S4) of detecting NS bit train portions 19, indicating section information of the road, which are installed at every 500 meters. Also, the controller 14 detects whether the NS bit train portion 32, indicating the ending of the branch point, is present or not (Step S11).

The controller 14 continues to carry out the N-polarity posture detection process until the detection in Step S11 is confirmed (Step S12).

After detection of the NS bit train portion 32 indicating the end of the branch point, the controller 14 halts the branching process stemming from the decision made in Step S5, having now decided that the desired travelling direction is the main path direction. Then, the controller 14 returns to the conventional traveling process along the main path 18a, repeating Steps S1, S2 and S3.

A process in which the desired direction, decided in Step S5, is a direction branching off from the main path shall be explained hereinafter.

That is, if the result in step S5 in YES, similar to the process performed in Step S6, the controller 14 determines whether the NS alternating arrangement portion occurring just before the branch point 20 has been detected or not (Step S13). If it has not yet been detected, the controller 14 continues to carry out the N-polarity posture detection process (Step S14).

In Step S13, when the NS alternating arrangement portion 26 is detected, that is if the result of Step S13 is YES (actually, the detection processing of the portion 26 is generated at a point during the NS alternating arrangement portion 26 shown in FIG. 3.), the controller 14 switches from a posture control based on N-polarity magnetic nails 16n to a posture control based on S-polarity magnetic nail 16s. Such an S-polarity based posture control implies that the controller 14 controls steering of the vehicle 10 by detecting the posture of the vehicle 10 with respect to S-polarity magnetic nail 16s. Posture control based on S-polarity magnetic nails 16s shall be referred to as the "S-polarity posture detection process" hereinafter.

When the NS alternating arrangement portion 26 is detected in Step S13, then the controller 14 confirms the existence of a constant number of S-polarity magnetic nails 16s, that is, whether the starting point 24 which occurs just at the beginning of the branching-path 18b is detected or not (Step S15). If the starting point 24 is not detected, the controller 14 continues to carry out the S-polarity posture detection process (Step S16).

If the decision in Step S15 is YES, then the controller 14 restarts the process (which was halted in Step S4) of detecting the NS bit train portions 19, indicating section information of the road, which are installed every 500 meters (Step S17). Also, the controller 14 decides whether the NS bit train portion 28 which indicates the end of the branch point, has been detected or not (Step S18).

The controller 14 continues to carry out the S-polarity posture detection process until an affirmative decision is made in Step S18 (Step S19).

After the detection of the NS bit train 28 indicating the end of the branch, it is judged whether N-polarity nails 16n have been detected or not (Step S20). Until the detection of the N-polarity nails 16n, the S-polarity posture detection process continues.

Once the N-polarity magnetic nails 16n have been detected, the branching process stemming from the decision made in Step S5 is finished, in that the desired travelling direction has been confirmed to be the branching path direction 18b. Then the controller 14 returns to the conventional traveling process used for the main path 18a, repeating Steps S1, S2 and S3. In this manner, after the vehicle 10 has passed through the branch point 20, the controller 14 looks upon the branching path 18b, which is thereafter continuously installed with N-polarity magnetic nails 16n, in the same manner as the main path 18a. Control is returned to Step S1, and automatic driving of the vehicle 10 can be carried out.

As described in the above embodiment, a train of magnetic nails along the main path 18a consists of N-polarity nails 16n, while the train of magnetic nails along the branching path 18b consists of S-polarity nails 16s. The vehicle 10 is equipped with magnetic sensors 12f, 12r which control the posture of the vehicle, based on detection of the vehicle 10 orientation with respect to the magnetic nails. In implementing such posture control, if the desired direction after passage through the branch point 20 is along the direction of the main path 18a, the driving mode is changed from the upstream side of the branch point 20 to begin detecting N-polarity magnetic nails 16n. On the other hand, if the desired direction after passage through the branch point 20 is along the direction of the branching path 18b, then the driving mode is changed from the upstream side of the branch point 20 to begin detecting S-polarity magnetic nails 16n.

By the above-described control, a basic automatic driving system for automatically driving a vehicle is realized, employing a vehicle 10 equipped with front and rear magnetic sensors 12f, 12r wherein the vehicle is automatically driven along a train of continuous N-polarity nails 16n disposed along a line at equal intervals. Further, a road 18 for guiding the vehicle is also achieved.

Furthermore, although the above embodiments describe a branching process for a road in which the main path 18a separates into a downstream main path 18a and a branching path 18b, the present invention could likewise be adapted, without departing from the spirit of the invention, to provide a process for a road in which a branching path 18b joins with the main path 18a.

Further, the present invention is not limited to the above embodiments, as various deviations therefrom could be conceived which nevertheless fall within the essence and scope of the invention.

As described above, according to the present invention, a main path and a branching path can be distinguished clearly and distinctly, based on differences in magnetic polarity. For example, the main path may have disposed therein N-polarity magnetic information sources and the branching path may have disposed therein S-polarity magnetic information sources.

That is, a road for guiding an automatically driven motor vehicle, according to the present invention, can easily accomplish a branching maneuver, based simply on the composition of the magnetic polarity used in the branching path, which differs from the magnetic polarity used in the main path.

Further, as the composition of the present invention is simple, when a vehicle runs on a road including the branch point therein, a branching maneuver can be carried out based solely on determining the polarities of the magnetic information sources embedded in the road.

At this point, inasmuch as the NS alternating arrangement portion is disposed in the vicinity of the branch point, between the main path and the branching path, the controller can easily recognize the existence of an upcoming branch point after detection the NS alternating arrangement portion.

Furthermore, downstream from the branch point, the branching path includes magnetic sources therein having the same polarity as the magnetic sources installed in the main path.

Hence, when the vehicle is a predetermined distance beyond the branch point between the main path and the branching path, the vehicle, when driven on the branching path, can be controlled in the same manner as on the main path.

Furthermore, the first NS bit train portion consists of appropriate arranged N-polarity and S-polarity magnetic information sources arranged at a upstream side of the main path before the branch point, and which indicate the existence of an upcoming branch point downstream on said main path. Accordingly, the controller can clearly and distinctly recognize a starting point (an NS bit train portion of mixed N and P polarity magnets for indicating an upcoming branch point) and an ending point (an NS bit train portion indication that the branch point has been passed through) of the branch point.

Further, in the present invention, the respective foundations of the main and branching paths having different magnetic sources installed therein. For example, the main path has N-polarity sources and the branching path has S-polarity sources respectively installed therein. Hence, when the desired travelling direction is along the main path, the posture of the vehicle can be ascertained by detecting only N-polarity magnetic information sources, whereas if the desired travelling direction is along the branching path, the posture of the vehicle can be ascertained by detecting only S-polarity magnetic information sources.

At this point, after detection of an NS alternating arrangement portion, once a given number of same-polarity magnetic sources have been detected, the controller is capable of deciding that the branch point has been passed through.

According to the present invention, once the NS bit train indicating the existence of an upcoming branch point has been detected, detection of an NS bit train portion which indicates section information of the road is halted. Thereafter, when the NS alternating arrangement is detected, and after a given number of same-polarity magnetic information sources have been detected, the controller decides that the branch point has been passed through. At this time, the controller re-initiates detection of the NS bit train portion for indicating section information of the road. Therefore, various running conditions can be distinguished, including a conventional running condition along a non-forking road which does not include any branching portions therein, a running condition along a non-forking road after having passed through a branch point, as well as a condition in which a branching process is performed for maneuvering through a branch point.

Although certain preferred embodiments of the present invention have been shown and described in detail, it should be understood that various changes and modifications may be made therein without departing from the scope of the appended claims.

What is claimed is:

1. A road having a system arranged therein for guiding an automatically driven motor vehicle, said vehicle being equipped with a magnetic sensor, comprising:

a main path having a plurality of first magnetic sources installed along a line therein at predetermined intervals in said road, said first magnetic sources being of one polarity; and a branching path having a plurality of second magnetic sources installed along a line therein at predetermined intervals in said road, said second magnetic sources being of a different polarity, wherein said branching path branches from said main path at a branching point;

wherein a posture of said vehicle is determined by detecting, with said magnetic sensor, said first and second magnetic sources, said first and second magnetic sources indicating a desired position of travel from a position before said branch point to a position beyond said branch point along one of said main path and said branching path.

2. A road having a system arranged therein for guiding an automatically driven motor vehicle according to claim 1, further comprising:

NS alternate arrangement portion comprising N-polarity magnetic sources and S-polarity magnetic sources alternately arranged in the vicinity of said branch point between said main path and said branching path.

3. A road having a system arranged therein for guiding an automatically driven motor vehicle according to claim 1, wherein said branching path has a further plurality of magnetic sources of the same polarity as said first magnetic sources installed in said main path, said further plurality of magnetic sources being disposed a predetermined distance beyond said branch point between said main path and said branching path.

4. A road having a system arranged therein for guiding an automatically driven motor vehicle according to claim 2, wherein said branching path has a further plurality of magnetic sources of the same polarity as said first magnetic sources installed in said main path, said further plurality of magnetic sources being disposed a predetermined distance beyond said branch point between said main path and said branching path.

5. A road having a system arranged therein for guiding an automatically driven motor vehicle according to claim 1, further comprising:

a first NS bit train portion consisting of a coded arrangement of N-polarity and S-polarity magnetic information sources, for indicating the existence of said branch point as an upcoming branch point, said first NS bit train portion being disposed in said main path at a position upstream from said branch point between said main path and said branch path; and second and third NS bit train portions consisting of respective coded arrangements of N-polarity and S-polarity magnetic information sources, for indicating that passage through said branch point has ended, said second and third NS bit train portions being disposed beyond said branch point respectively in each of said main path and said branch path after a predetermined number of magnetic information sources of the same polarity.

6. A road having a system arranged therein for guiding an automatically driven motor vehicle according to claim 2, further comprising:

a first NS bit train portion consisting of a coded arrangement of N-polarity and S-polarity magnetic information sources, for indicating the existence of said branch point as an upcoming branch point, said first NS bit train portion being disposed in said main path at a position upstream from said branch point between said main path and said branch path; and second and third NS bit train portions consisting of respective coded arrangements of N-polarity and S-polarity magnetic information sources, for indicating that passage through said branch point has ended, said second and third NS bit train portions being disposed beyond said branch point respectively in each of said main path and said branch path after a predetermined number of magnetic information sources of the same polarity.

7. A road having a system arranged therein for guiding an automatically driven motor vehicle according to claim 3, further comprising:

a first NS bit train portion consisting of a coded arrangement of N-polarity and S-polarity magnetic information sources, for indicating the existence of said branch point as an upcoming branch point, said first NS bit train portion being disposed in said main path at a portion upstream from said branch point between said main path and said branch path; and second and third NS bit train portions consisting of respective coded arrangements of N-polarity and S-polarity magnetic information sources, for indicating that passage through said branch point has ended, said second and third NS bit train portions being disposed beyond said branch point respectively in each of said main path and said branch path after a predetermined number of magnetic information sources of the same polarity.

8. A road having a system arranged therein for guiding an automatically driven motor vehicle according to claim 4, further comprising:

a first NS bit train portion consisting of a coded arrangement of N-polarity and S-polarity magnetic information sources, for indicating the existence of said branch point as an upcoming branch point, said first NS bit train portion being disposed in said main path at a position upstream from said branch point between said main path and said branch path; and second and third NS bit train portions consisting of respective coded arrangements of N-polarity and S-polarity magnetic information sources, for indicating that passage through said branch point has ended, said second and third NS bit train portions being disposed beyond said branch point respectively in each of said main path and said branch path after a predetermined number of magnetic information sources of the same polarity.

9. A driving method for driving on a road which guides an automatically driven motor vehicle, comprising the steps of:

providing a road with magnetic sources disposed therein, said road comprising, a main path having a plurality of first magnetic sources installed along a line therein at predetermined intervals, said first magnetic sources being of one polarity, a branching path having a plurality of second magnetic sources installed along a line therein at predetermined intervals, said second magnetic sources being of a different polarity, wherein said branching path branches from said main path, and NS alternate arrangement portion comprising N-polarity magnetic sources and S-polarity magnetic sources alternately arranged in the vicinity of a branch point between said main path and said branching path;

equipping the vehicle with a magnetic sensor; and detecting a posture of said vehicle by detecting, with said magnetic sensor, only said first and second magnetic sources, said first and second magnetic sources indicating a desired direction of travel from a position before said branch point to a position beyond said branch point along either one of said main path or said branching path.

10. A driving method for driving on a road which guides an automatically driven motor vehicle, comprising the steps of:

providing a road with magnetic sources disposed therein, said road comprising, a main path having a plurality of first magnetic sources installed along a line therein at predetermined intervals, said first magnetic sources being of one polarity, a branching path having a plurality of second magnetic sources installed along a line therein at predetermined intervals, said second magnetic sources being of a different polarity, wherein said branching path branches from said main path, and NS alternate arrangement portion comprising N-polarity magnetic sources and S-polarity magnetic sources alternately arranged in the vicinity of a branch point between said main path and said branching path;

equipping the vehicle with a magnetic sensor; and detecting said NS alternate arrangement portion with said magnetic sensor, and thereafter determining that said branch point has been traversed when a predetermined number of like-polarity magnetic sources are detected.

11. A driving method for driving on a road which guides an automatically driven motor vehicle, comprising the steps of:

providing a road with magnetic sources disposed therein, said road comprising, a main path having a plurality of first magnetic sources installed along a line therein at predetermined intervals, said first magnetic sources being of one polarity, said main path further comprising a plurality of NS bit train portions disposed at predetermined distances, each consisting of a combination of N-polarity and S-polarity magnetic information sources for indicating respective sections of said road, a branching path having a plurality of second magnetic sources installed along a line therein at predetermined intervals, said second magnetic sources being of a different polarity, wherein said branching path branches from said main path, said branching path further comprising a plurality of NS bit train portions disposed at predetermined distances, each consisting of a combination of N-polarity and S-polarity magnetic information sources for indicating respective sections of said road, NS alternate arrangement portion comprising N-polarity magnetic sources and S-polarity magnetic sources alternately arranged in the vicinity of a branch point between said main path and said branching path, and an NS bit train portion consisting of a coded arrangement of N-polarity and S-polarity magnetic information sources, indicating the existence of an upcoming branch point, said NS bit train portion being disposed in said main path at a position upstream from said branch point;

equipping the vehicle with a magnetic sensor;

while detecting said NS bit train portion indicating the existence of an upcoming branch point, halting detection of said NS bit train portions which indicate respective sections of the road;

detecting said NS alternate arrangement portion with said magnetic sensor, and thereafter determining that said branch point has been traversed when a predetermined number of like-polarity magnetic sources are detected; and reinitiating detection of said NS bit trains portions which indicate respective sections of the road.

* * * * *